(12) United States Patent
Carini et al.

(10) Patent No.: US 6,258,742 B1
(45) Date of Patent: Jul. 10, 2001

(54) METHOD OF MANUFACTURE OF PHOSPHATE-BONDED REFRACTORIES

(76) Inventors: George F. Carini; George F. Carini, II, both of 729 Washington Ave., Apartment 14, Carnegie, PA (US) 15106

( * ) Notice: Subject to any disclaimer, the term of this patent is extended or adjusted under 35 U.S.C. 154(b) by 0 days.

(21) Appl. No.: 09/329,522

(22) Filed: Jun. 10, 1999

(51) Int. Cl.$^7$ .................................................. C04B 35/447
(52) U.S. Cl. ........................... 501/94; 501/127; 501/142; 501/153
(58) Field of Search .............................. 501/94, 127, 142, 501/153

(56) References Cited

U.S. PATENT DOCUMENTS

| | | | |
|---|---|---|---|
| 3,284,218 | | 11/1966 | King ....................................... 106/65 |
| 4,459,156 | * | 7/1984 | Henslee et al. ....................... 501/111 |
| 4,833,576 | * | 5/1989 | Mers et al. ........................... 362/226 |
| 5,496,529 | * | 3/1996 | Fogel et al. .......................... 423/305 |
| 5,707,442 | * | 1/1998 | Fogel et al. .......................... 106/629 |

FOREIGN PATENT DOCUMENTS

1458340 * 2/1989 (RU) .

* cited by examiner

*Primary Examiner*—Paul Marcantoni
(74) *Attorney, Agent, or Firm*—Webb Ziesenheim Logsdon Orkin & Hanson, P.C.

(57) ABSTRACT

A phosphate-bonded refractory composition consists of a size-graded mixture of refractory material, 3 to 5 weight percent based on the total weight of the batch of finely divided aluminium hydroxide, 4.22 to 8.37 percent by weight of the total weight of the batch of 75 to 85 percent phosphoric acid, the ratio of the aluminum in the aluminum hydroxide to phosphorus in phosphoric acid being about 1:1.

3 Claims, No Drawings

METHOD OF MANUFACTURE OF PHOSPHATE-BONDED REFRACTORIES

BACKGROUND OF THE INVENTION

This invention relates to phosphate-bonded refractory compositions and to a method of manufacture.

Phosphate-bonded refractories have been extensively used in the iron, steel, aluminum and brass industries to line vessels for containment of molten metals and other applications for more than 50 years. These products are well known for their ability to withstand high temperatures and attack by molten metals and slags. They are further characterized by ease of forming, linear and volume stability, high strength both dried and fired, and excellent resistance to abrasion and to mechanical impact at high temperatures. The full range of phosphate-bonded refractories, including chemically bonded and fired brick, monoliths, and special shapes suitable for use in a wide range of high temperature applications, can be produced by the manufacturing method of the present invention.

SUMMARY OF THE INVENTION

This invention pertains to a method of manufacturing phosphate-bonded refractories having a proto aluminum orthophosphate chemical binder formed entirely during the mixing cycle by reacting orthophosphoric acid ($H_3PO_4$); finely divided aluminum hydroxide ($Al(OH)_3$) and water. An aluminum orthophosphate ($AlPO_4$) ceramic bond is formed progressively with the loss of combined water at temperatures from 212° F. to 1200° F. The true character of the proto aluminum orthophosphate is not known. It is believed, however, that the reaction product is an aluminum acid orthophosphate ($AlHPO_4$) or an aluminum orthophosphate gel. The method discovered is a direct, simple and inexpensive way of manufacturing the broadest range of high performance phosphate-bonded refractories at low cost.

We have discovered that it is possible to react orthophosphoric acid with finely divided aluminum hydroxide and water in a refractory batch during the mixing cycle. The batch weights of aluminum hydroxide and orthophosphoric acid must be calculated to yield a proto aluminum orthophosphate which on drying and fired to a temperature of approximately 1200° F. will yield an aluminum orthophosphate ceramic bond. The three proportioned batch components—aluminum hydroxide, water and orthophosphoric acid—react in the pan to form a proto aluminum orthophosphate without generating the excessive heat which characterizes exothermic reactions. The ratio of phosphorus pentoxide ($P_2O_5$) in either 85% or 75% orthophosphoric acid ($H_3PO_4$) to aluminum oxide ($Al_2O_3$) in aluminum hydroxide ($Al(OH)_3$) must be at least 1.3923 to 1. It is absolutely necessary to assure that a slight excess of aluminum hydroxide be present to prevent crystallization of aluminum metaphosphate ($Al(PO_3)_3$). An excess of orthophosphoric acid will result in the development of aluminum metaphosphate directly proportional to the excess phosphoric acid available. The workability of the resultant phosphate-bonded product will be decreased as a function of time; that is, the product will have an attenuated "shelf life".

Three batch components, aluminum hydroxide, water and orthophosphoric acid, react in the pan to form aluminum acid phosphate without generating excessive heat. After forming the finished product and upon heating to approximately 1200° F., the aluminum acid phosphate progressively loses chemically combined water ultimately forming aluminum orthophosphate.

A broad compositional range of sized refractory materials may be used to formulate phosphate bonded refractories. High alumina aggregates are the most commonly used in phosphate-bonded refractories. Zircon, silica, silicon carbide, chromium oxide and other non-alumina materials may also be incorporated to modify properties.

In practicing the present invention, standard procedures are followed in formulating, proportioning, batching and mixing. Finely divided aluminum hydroxide is introduced to the mixer with other dry batch components. The batch is dry mixed for the time required to distribute the aluminum hydroxide uniformly through the batch. In high efficiency mixers, one to two minutes are required to blend a one ton batch. Water is then added while mixing. In mixes, such as mortars and plasters containing greater than 7.0% water, the initial water addition is restricted to 7.0% of the total batch weight. The balance of the water is added after the orthophosphoric acid addition. Following the initial water addition, 75% or 85% orthophosphoric acid is added. The calculated ratio of 85% orthophosphoric acid to aluminum hydroxide by weight is less than 1.4782 to 1 and preferably 1.4078 to 1. The calculated ratio of 75% orthophosphoric acid to aluminum hydroxide by weight is less than 1.6757 to 1 and preferably 1.5955 to 1. The remaining water is added and mixing is completed. When using 75% orthophosphoric acid, the free water addition to the batch must be decreased by a factor of 0.1176 of the total weight of the 75% orthophosphoric acid addition. After forming the finished product and upon heating to at least 600° F. and preferably to 1200° F., the proto aluminum orthophosphate progressively loses water ultimately forming aluminum orthophosphate.

DESCRIPTION OF THE PREFERRED EMBODIMENTS

Tables 1-A, 1-B and 1-C pertain to high alumina phosphate-bonded plastic products. Table 1-A contains the batch ingredients, Table 1-B the matrix phase analysis for each batch and Table 1-C the total percentage of alumina, silica and phosphorus pentoxide in each batch. Batches A to C in Table 1-A contain, as a principal ingredient, −325 mesh calcined low soda alumina, which is a high cost batch component. Batches B, C, and D illustrate that, with the binder disclosed herein, −325 mesh calcined bauxite, a low cost batch component, can be substituted for low soda alumina with no detrimental effects. All of the batches disclosed in Table 1-A and each of the other tables herein have been mixed, formed and observed for satisfactory formability and shelf life.

Table 2 pertains to high alumina fine grain phosphate-bonded plastic batches.

Table 3 pertains to high alumina phosphate-bonded wet gunning batches.

Table 4 pertains to low expansion phosphate-bonded plastic batches.

Table 5 pertains to high alumina phosphate-bonded dry ramming batches.

Table 6 pertains to phosphate-bonded vibration placed ramming batches.

Table 7 pertains to phosphate-bonded coating batches.

Table 8 pertains to phosphate-bonded mortars.

Table 9 pertains to high alumina phosphate-bonded plastic batches.

Table 10 pertains to high alumina phosphate-bonded lightweight ramming batches.

Table 11 pertains to phosphate-bonded alumina chromia ramming batches.

Table 12 pertains to high alumina phosphate-bonded plastic batches.

TABLE 1-A

HIGH ALUMINA (78%–82% $Al_2O_3$) PHOSPHATE-BONDED PLASTIC

|  | Raw Material | Batch A | Batch B | Batch C | Batch D |
|---|---|---|---|---|---|
| Aggregate A | 4 × 8 Mesh Calcined Bauxite | 210 | 210 | 210 | 210 |
| Aggregate A | 8 × 20 Mesh Calcined Bauxite | 240 | 240 | 240 | 240 |
| Aggregate A | 20 Mesh Calcined Bauxite | 450 | 450 | 450 | 450 |
|  | 35 Mesh Raw Kyanite | 200 | 200 | 200 | 200 |
|  | 200 Mesh Volclay | 50 | 50 | 50 | 50 |
|  | 325 Mesh Silica (Quartz) | 50 | 50 | 50 | 50 |
|  | −200 Mesh Aluminum Hydroxide | 78 | 78 | 78 | 78 |
|  | −325M Calc. Low Soda Alumina | 525 | 300 | 150 | 0 |
| Aggregate A | −325 Mesh Calcined Bauxite | 0 | 225 | 375 | 525 |
|  | 85% Phosphoric Acid | 110 | 110 | 110 | 110 |
|  | Water | 136 | 136 | 136 | 136 |
| Optional Additive | Powdered Boric Acid | 3 | 3 | 3 | 3 |
| Optional Additive | Sugar | 5 | 5 | 5 | 5 |
|  | TOTAL: | 2057 | 2057 | 2057 | 2057 |

TABLE 1-B

CALCULATED MATRIX PHASE ANALYSIS AT TEMPERATURES GREATER THAN 2300° F.

| Formula | Phase | Batch A | Batch B | Batch C | Batch D |
|---|---|---|---|---|---|
| $3Al_2O_3 \cdot 2SiO_2$ | Mullite | 33.7 | 44.6 | 49.4 | 54.1 |
| $Al_2O_3$ | Corundum | 49.9 | 37.4 | 31.5 | 25.5 |
| $Al_2O_3 \cdot P_2O_5$ | Aluminum Orthophosphate | 15.1 | 15.1 | 15.1 | 15.1 |

TABLE 1-C

TOTAL PERCENTAGE ALUMINA, SILICA AND PHOSPHORUS PENTOXIDE

| Total Chemical Analysis % | Batch A | Batch B | Batch C | Batch D |
|---|---|---|---|---|
| $Al_2O_3$ | 81.90 | 80.38 | 79.29 | 78.21 |
| $SiO_2$ | 10.53 | 11.60 | 12.18 | 12.76 |
| $P_2O_5$ | 3.75 | 3.75 | 3.75 | 3.75 |

TABLE 2

HIGH ALUMINA FINE GRAINED PHOSPHATE-BONDED PLASTIC

|  | Raw Material | Batch A | Batch B | Batch C | Batch D |
|---|---|---|---|---|---|
| Aggregate A | 8 × 20 Mesh Calcined Bauxite | 400 | 400 | 400 | 400 |
| Aggregate A | 20 Mesh Calcined Bauxite | 400 | 400 | 400 | 400 |
|  | 35 Mesh Raw Kyanite | 200 | 200 | 200 | 200 |
|  | 200 Mesh Volclay | 50 | 50 | 50 | 50 |
|  | 325 Mesh Silica (Quartz) | 50 | 50 | 50 | 50 |
|  | −200 Mesh Aluminum Hydroxide | 78 | 78 | 78 | 78 |
|  | −325M Calc. Low Soda Alumina | 575 | 300 | 150 | 0 |
| Aggregate A | −325 Mesh Calcined Bauxite | 0 | 275 | 425 | 575 |
|  | 85% Phosphoric Acid | 110 | 110 | 110 | 110 |
|  | Water | 152 | 152 | 152 | 152 |
| Optional Additive | Powdered Boric Acid | 3 | 3 | 3 | 3 |
| Optional Additive | Sugar | 5 | 5 | 5 | 5 |
|  | TOTAL: | 2023 | 2023 | 2023 | 2023 |

TABLE 3

HIGH ALUMINA PHOSPHATE-BONDED WET GUNNING

|   | Raw Material | Batch A | Batch B | Batch C | Batch D |
|---|---|---|---|---|---|
| Aggregate A | 4 × 8 Mesh Calcined Bauxite | 450 | 450 | 450 | 450 |
| Aggregate A | 8 × 20 Mesh Calcined Bauxite | 300 | 300 | 300 | 300 |
| Aggregate A | 20 Mesh Calcined Bauxite | 400 | 400 | 400 | 400 |
|   | 48 Mesh Raw Kyanite | 100 | 100 | 100 | 100 |
|   | 200 Mesh Volclay | 50 | 50 | 50 | 50 |
|   | 325 Mesh Silica (Quartz) | 25 | 25 | 25 | 25 |
|   | −200 Mesh Aluminum Hydroxide | 110 | 110 | 110 | 110 |
|   | −325M Calc. Low Soda Alumina | 500 | 300 | 150 | 0 |
| Aggregate A | −325 Mesh Calcined Bauxite | 0 | 200 | 350 | 500 |
|   | 85% Phosphoric Acid | 155 | 155 | 155 | 155 |
|   | Water | 60 | 60 | 60 | 60 |
| Optional Additive | Powdered Boric Acid | 3 | 3 | 3 | 3 |
| Optional Additive | Sisal Fiber 250 | 2 | 2 | 2 | 2 |
|   | TOTAL: | 2155 | 2155 | 2155 | 2155 |

TABLE 4

HIGH ALUMINA (83%–87%) LOW EXPANSION PHOSPHATE-BONDED PLASTIC

|   | Raw Material | Batch A | Batch B | Batch C | Batch D |
|---|---|---|---|---|---|
| Aggregate A | 4 × 8 Mesh Calcined Bauxite | 140 | 140 | 140 | 140 |
| Aggregate A | 8 × 20 Mesh Calcined Bauxite | 160 | 160 | 160 | 160 |
| Aggregate A | 20 Mesh Calcined Bauxite | 200 | 200 | 200 | 200 |
|   | 6 Mesh Tabular Alumina | 400 | 400 | 400 | 400 |
|   | 14 Mesh Tabular Alumina | 100 | 100 | 100 | 100 |
|   | 35 Mesh Calcined Mullite | 100 | 100 | 100 | 100 |
|   | 100 Mesh Calcined Mullite | 100 | 100 | 100 | 100 |
|   | 200 Mesh Volclay | 50 | 50 | 50 | 50 |
|   | −200 Mesh Aluminum Hydroxide | 78 | 78 | 78 | 78 |
|   | −325M Calc. Low Soda Alumina | 550 | 350 | 175 | 0 |
| Aggregate A | −325 Mesh Calcined Bauxite | 0 | 200 | 375 | 550 |
|   | 85% Phosphoric Acid | 110 | 110 | 110 | 110 |
|   | Water | 125 | 125 | 125 | 125 |
| Optional Additive | Powdered Boric Acid | 3 | 3 | 3 | 3 |
| Optional Additive | Sugar | 3 | 3 | 3 | 3 |
|   | TOTAL: | 2119 | 2119 | 2119 | 2119 |

TABLE 5

HIGH ALUMINA PHOSPHATE-BONDED RAM (DRY)

|   | Raw Material | Batch A | Batch B | Batch C | Batch D |
|---|---|---|---|---|---|
| Aggregate E | 4 × 8 Mesh Calc. 47% Alumina | 200 | 200 | 200 | 200 |
| Aggregate E | 8 × 20 Mesh Calc. 47% Alumina | 550 | 550 | 550 | 550 |
| Aggregate E | 20 Mesh Calc. 47% Alumina | 300 | 300 | 300 | 300 |
|   | 35 Mesh Raw Kyanite | 100 | 100 | 100 | 100 |
|   | 100 Mesh Raw Kyanite | 100 | 100 | 100 | 100 |
|   | 200 Mesh Volclay | 50 | 50 | 50 | 50 |
|   | −200 Mesh Aluminum Hydroxide | 75 | 75 | 75 | 75 |
|   | −325M Calc. Low Soda Alumina | 500 | 300 | 150 | 0 |
| Aggregate A | −325 Mesh Calcined Bauxite | 0 | 200 | 350 | 500 |
|   | 85% Phosphoric Acid | 100 | 100 | 100 | 100 |
|   | Water | 60 | 60 | 60 | 60 |
| Optional Additive | Powdered Boric Acid | 0 | 0 | 0 | 0 |
| Optional Additive | Sugar | 0 | 0 | 0 | 0 |
|   | TOTAL: | 2035 | 2035 | 2035 | 2035 |

TABLE 6

HIGH ALUMINA PHOSPHATE-BONDED VIBRATION PLACED RAM

| | Raw Material | Batch A | Batch B | Batch C | Batch D |
|---|---|---|---|---|---|
| Aggregate D | 3 × 8 Mesh Calc. 60% Alumina | 200 | 200 | 200 | 200 |
| Aggregate E | 8 × 20 Mesh Calc. 47% Alumina | 550 | 550 | 550 | 550 |
| Aggregate E | 20 Mesh Calc. 47% Alumina | 300 | 300 | 300 | 300 |
| | 100 Mesh Raw Kyanite | 200 | 200 | 200 | 200 |
| | 325 Mesh Silica (Quartz) | 50 | 50 | 50 | 50 |
| | −200 Mesh Aluminum Hydroxide | 75 | 75 | 75 | 75 |
| | −325M Calc. Low Soda Alumina | 450 | 300 | 150 | 0 |
| Aggregate A | −325 Mesh Calcined Bauxite | 0 | 150 | 300 | 450 |
| | 85% Phosphoric Acid | 100 | 100 | 100 | 100 |
| | Water | 77 | 77 | 77 | 77 |
| Optional Additive | Powdered Boric Acid | 0 | 0 | 0 | 0 |
| Optional Additive | Sugar | 0 | 0 | 0 | 0 |
| | TOTAL: | 2002 | 2002 | 2002 | 2002 |

TABLE 7

HIGH ALUMINA PHOSPHATE-BONDED COATING

| | Raw Material | Batch A | Batch B | Batch C | Batch D |
|---|---|---|---|---|---|
| Aggregate Z | Zircon Sand | 500 | 500 | 500 | 500 |
| | 35 Mesh Raw Kyanite | 100 | 100 | 100 | 100 |
| Aggregate B | −30 Mesh 90% Calcined Alumina | 500 | 500 | 500 | 500 |
| | 200 Mesh Volclay | 50 | 50 | 50 | 50 |
| | 325 Mesh Silica | 200 | 200 | 200 | 200 |
| | −200 Mesh Aluminum Hydroxide | 78 | 78 | 78 | 78 |
| | −325M Calc. Low Soda Alumina | 350 | 250 | 125 | 0 |
| Aggregate A | −325 Mesh Calcined Bauxite | 0 | 100 | 225 | 350 |
| | 85% Phosphoric Acid | 110 | 110 | 110 | 110 |
| | Water | 316 | 316 | 316 | 316 |
| Optional Additive | Powdered Boric Acid | 0 | 0 | 0 | 0 |
| Optional Additive | Sugar | 0 | 0 | 0 | 0 |
| | TOTAL: | 2272 | 2272 | 2272 | 2272 |

TABLE 8

HIGH ALUMINA PHOSPHATE-BONDED MORTAR

| | Raw Material | Batch A | Batch B | Batch C | Batch D |
|---|---|---|---|---|---|
| Aggregate A | 20 Mesh Calcined Bauxite | 200 | 200 | 200 | 200 |
| Aggregate A | 48 Mesh Calcined Bauxite | 400 | 400 | 400 | 400 |
| | 35 Mesh Raw Kyanite | 100 | 100 | 100 | 100 |
| | 200 Mesh Volclay | 60 | 60 | 60 | 60 |
| | −200 Mesh Aluminum Hydroxide | 85 | 85 | 85 | 85 |
| | −325M Calc. Low Soda Alumina | 780 | 580 | 390 | 0 |
| Aggregate A | −325 Mesh Calcined Bauxite | 0 | 200 | 390 | 780 |
| | 85% Phosphoric Acid | 120 | 120 | 120 | 120 |
| | Water | 283 | 283 | 283 | 283 |
| Optional Additive | Powdered Boric Acid | 0 | 0 | 0 | 0 |
| Optional Additive | Sugar | 0 | 0 | 0 | 0 |
| | TOTAL: | 2028 | 2028 | 2028 | 2028 |

TABLE 9

HIGH ALUMINA PHOSPHATE-BONDED PLASTIC

|   | Raw Material | Batch A | Batch B | Batch C | Batch D |
|---|---|---|---|---|---|
| Aggregate A | 4 × 8 Mesh Calcined Bauxite | 280 | 280 | 280 | 280 |
| Aggregate A | 8 × 20 Mesh Calcined Bauxite | 320 | 320 | 320 | 320 |
| Aggregate A | 20 Mesh Calcined Bauxite | 200 | 200 | 200 | 200 |
|   | 35 Mesh Raw Kyanite | 200 | 200 | 200 | 200 |
|   | 200 Mesh Volclay | 50 | 50 | 50 | 50 |
|   | 325 Mesh Silica | 50 | 50 | 50 | 50 |
|   | −200 Mesh Aluminum Hydroxide | 78 | 78 | 78 | 78 |
|   | −325M Calc. Low Soda Alumina | 600 | 400 | 200 | 0 |
| Aggregate A | −325 Mesh Calcined Bauxite | 0 | 200 | 400 | 600 |
|   | 85% Phosphoric Acid | 110 | 110 | 110 | 110 |
|   | Water | 185 | 185 | 185 | 185 |
| Optional Additive | Powdered Boric Acid | 3 | 3 | 3 | 3 |
| Optional Additive | Sugar | 5 | 5 | 5 | 5 |
|   | TOTAL: | 2081 | 2081 | 2081 | 2081 |

20

TABLE 10

HIGH ALUMINA PHOSPHATE-BONDED LIGHT WEIGHT RAM

|   | Raw Material | Batch A | Batch B | Batch C | Batch D |
|---|---|---|---|---|---|
| Aggregate E | 8 × 20 Mesh 47% Calc. Alumina | 100 | 100 | 100 | 100 |
| Aggregate E | 20 Mesh 47% Calcined Alumina | 200 | 200 | 200 | 200 |
| Aggregate LW | 20M 30% $Al_2O_3$ Hollow Spheres | 525 | 525 | 525 | 525 |
|   | 35 Mesh Raw Kyanite | 200 | 200 | 200 | 200 |
|   | 200 Mesh Volclay | 50 | 50 | 55 | 50 |
|   | −200 Mesh Aluminum Hydroxide | 85 | 85 | 85 | 85 |
|   | −325M Calc. Low Soda Alumina | 650 | 400 | 250 | 0 |
| Aggregate A | −325 Mesh Calcined Bauxite | 0 | 250 | 400 | 650 |
|   | 85% Phosphoric Acid | 120 | 120 | 120 | 120 |
|   | Water | 130 | 130 | 130 | 130 |
| Optional Additive | Powdered Boric Acid | 3 | 3 | 3 | 3 |
| Optional Additive | Sugar | 0 | 0 | 0 | 0 |
|   | TOTAL: | 2063 | 2063 | 2063 | 2063 |

TABLE 11

HIGH ALUMINA PHOSPHATE-BONDED ALUMINA-CHROMIA RAM

|   | Raw Material | Batch A | Batch B | Batch C | Batch D |
|---|---|---|---|---|---|
| Aggregate T | 6× Down Tabular Alumina | 1300 | 0 |   |   |
| Aggregate T | 6 × 12 Mesh Tabular Alumina | 0 | 350 |   |   |
| Aggregate T | 8 × 20 Mesh Tabular Alumina | 0 | 550 |   |   |
| Aggregate T | 20 Mesh Tabular Alumina | 0 | 400 |   |   |
|   | 200 Mesh Volclay | 40 | 40 |   |   |
|   | −200 Mesh Aluminum Hydroxide | 78 | 78 |   |   |
|   | −325M Calc. Low Soda Alumina | 300 | 300 |   |   |
|   | Chrome Oxide Pigment Grade | 140 | 140 |   |   |
|   | 85% Phosphoric Acid | 110 | 110 |   |   |
|   | Water | 31 | 31 |   |   |
| Optional Additive | Powdered Boric Acid | 3 | 3 |   |   |
| Optional Additive | Sisal Fiber 250 | 2 | 2 |   |   |
|   | TOTAL: | 2004 | 2004 |   |   |

TABLE 12

HIGH ALUMINA PHOSPHATE-BONDED PLASTIC

| | Raw Material | Batch A | Batch B | Batch C | Batch D |
|---|---|---|---|---|---|
| Aggregate E | 4 × 8 Mesh Calc. 47% Alumina | 300 | 300 | 300 | 300 |
| Aggregate E | 8 × 20 Mesh Calc. 47% Alumina | 400 | 400 | 400 | 400 |
| Aggregate E | 20 Mesh Calc. 47% Alumina | 200 | 200 | 200 | 200 |
| | 35 Mesh Raw Kyanite | 100 | 100 | 100 | 100 |
| | 100 Mesh Raw Kyanite | 100 | 100 | 100 | 100 |
| | 200 Mesh Volclay | 60 | 60 | 60 | 60 |
| | −200 Mesh Aluminum Hydroxide | 78 | 78 | 78 | 78 |
| | −325M Calc. Low Soda Alumina | 0 | 0 | 0 | 550 |
| Aggregate A | −325 Mesh Calcined Bauxite | 0 | 200 | 550 | 0 |
| Aggregate E | −325M Calcined 47% Alumina | 550 | 350 | 0 | 0 |
| | 85% Phosphoric Acid | 110 | 110 | 110 | 110 |
| | Water | 145 | 145 | 145 | 145 |
| Optional Additive | Powdered Boric Acid | 3 | 3 | 3 | 3 |
| Optional Additive | Sugar | 5 | 5 | 5 | 5 |
| | TOTAL: | 2051 | 2051 | 2051 | 2051 |

Having thus described our invention with the detail and particularity required by the Patent Laws, what is desired protected by Letters Patent is set forth in the following claims.

We claim:

1. A method of manufacturing a phosphate-bonded refractory product by forming a proto aluminum phosphate chemical binder entirely during the mixing process comprising the steps of:
   a) mixing a size-graded refractory material comprising at least 50 percent by weight of the batch with finely divided minus 200 mesh aluminum hydroxide;
   b) blending the ingredients mixed in step a) in a high efficiency mixer to distribute the aluminum hydroxide uniformly through the batch;
   c) adding up to 7 percent by weight water;
   d) adding 4.22 to 8.37 percent based on the total weight of the batch of 75 to 85 percent phosphoric acid in an amount to provide an atomic ratio of aluminum in the aluminum hydroxide to the phosphorus in the phosphoric acid of about 1:1; and
   e) adding any additional water to provide workability.

2. A method of manufacturing a phosphate-bonded refractory product by forming a proto aluminum phosphate chemical binder entirely during the mixing process comprising the steps of:
   a) mixing a size-graded refractory material with finely divided −200 mesh aluminum hydroxide;
   b) blending the ingredients mixed in step a) in a high efficiency mixer to distribute the aluminum hydroxide uniformly through the batch;
   c) adding up to 7 percent by weight water;
   d) adding 4.22 to 8.37 percent based on the total weight of the batch of 75 to 85 percent phosphoric acid in an amount to provide an atomic ratio of aluminum in the aluminum hydroxide to the phosphorus in the phosphoric acid of about 1:1; and
   e) adding any additional water to provide workability.

3. A method of preparing a phosphate-bonded refractory composition comprising:
   a) mixing a size-graded refractory material with 3 to 5 weight percent based on the total weight of the batch of finely divided aluminum hydroxide;
   b) blending the ingredients mixed in step a) to distribute the aluminum hydroxide uniformly through the batch;
   c) adding up to 7 percent by weight water;
   d) adding 4.22 to 8.37 percent based on the total weight of the batch of 75 to 85 percent phosphoric acid in an amount to provide an atomic ratio of aluminum in the aluminum hydroxide to the phosphoric acid of about 1:1; and
   e) adding any additional water to provide workability.

* * * * *